Patented Jan. 5, 1932

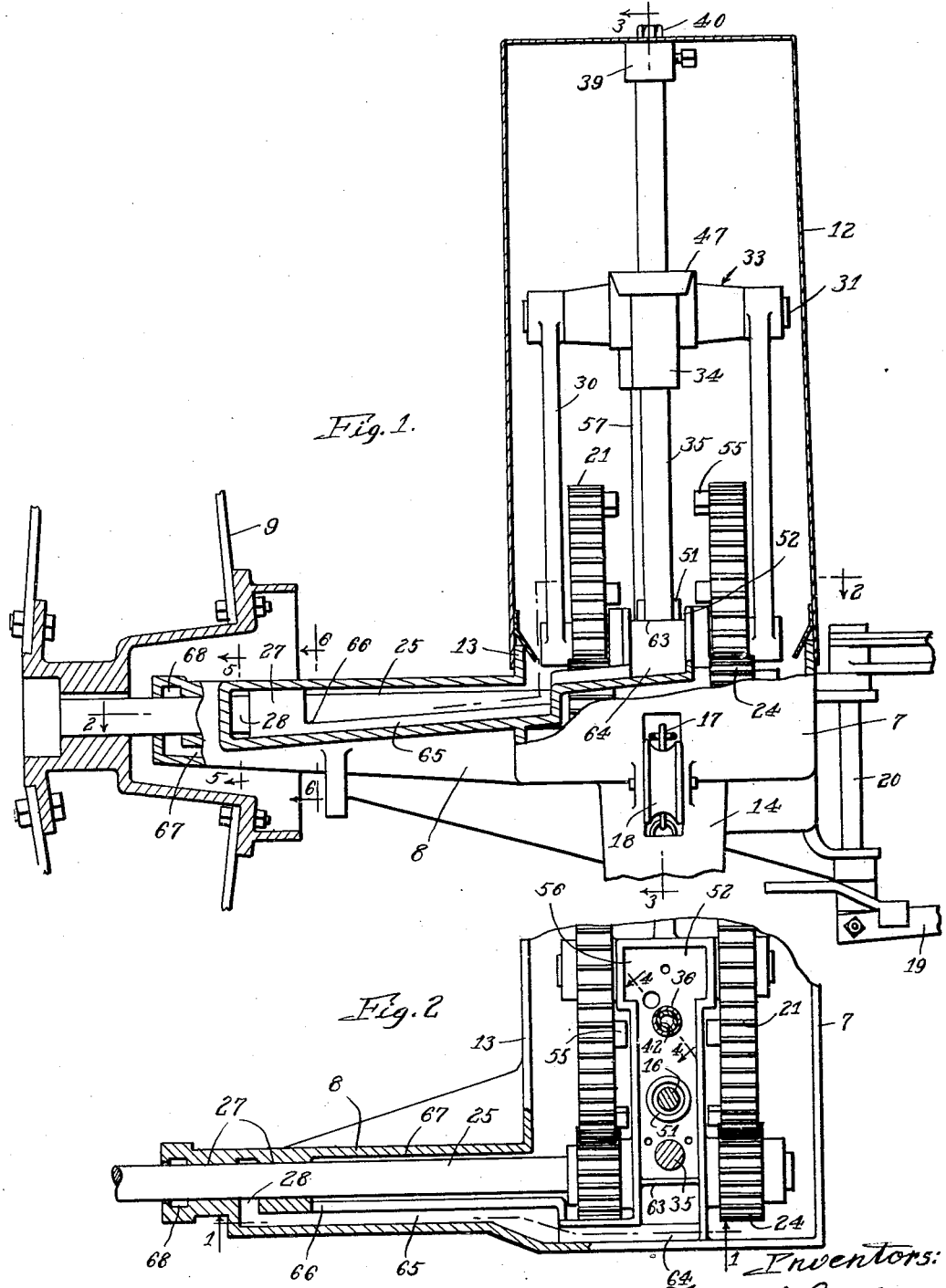

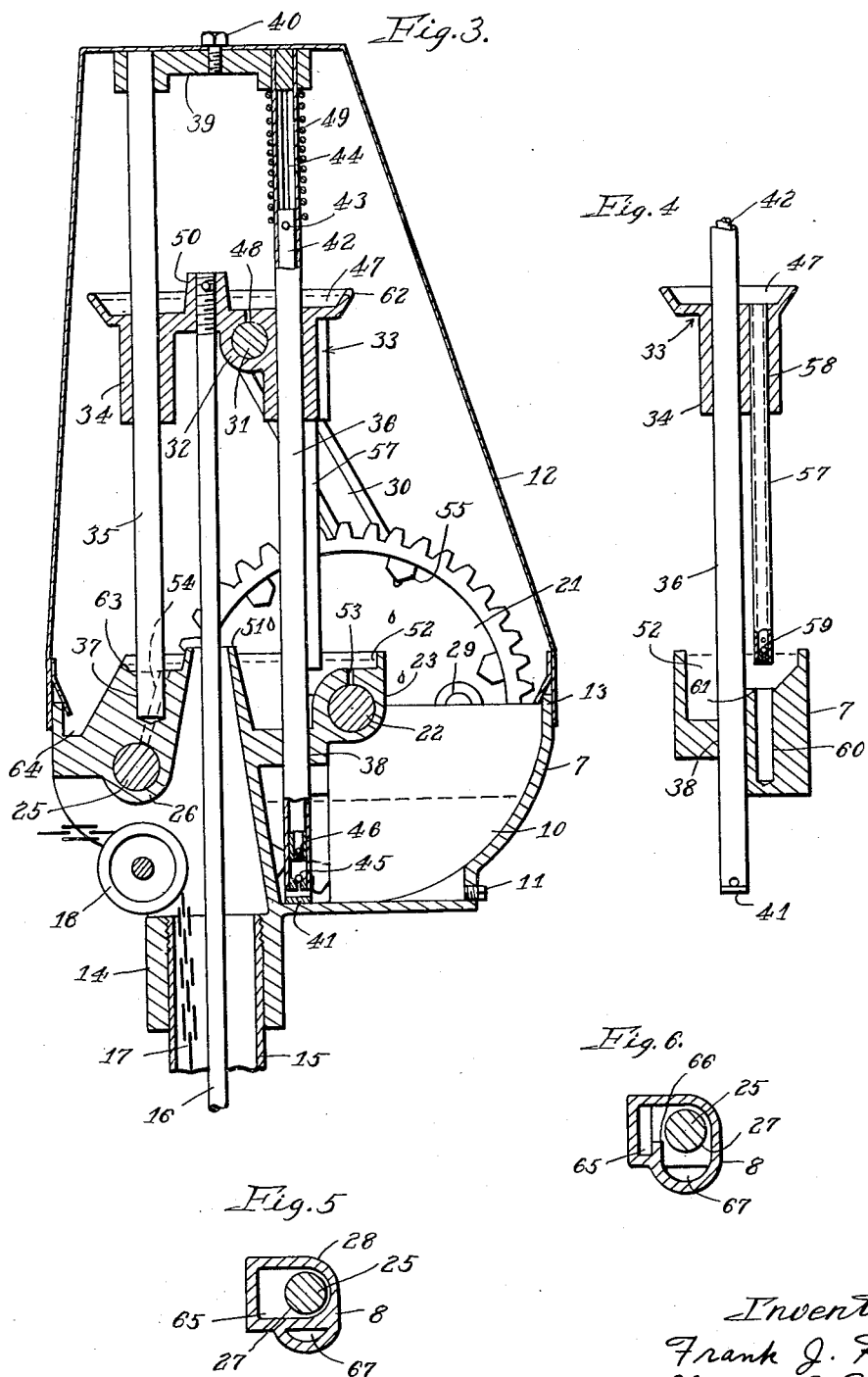

1,839,549

UNITED STATES PATENT OFFICE

FRANK J. HALLER AND CLARENCE B. MOLTER, OF FREEPORT, ILLINOIS, ASSIGNORS TO STOVER MANUFACTURING & ENGINE CO., OF FREEPORT, ILLINOIS, A CORPORATION OF ILLINOIS

WINDMILL LUBRICATION SYSTEM

Application filed December 17, 1928. Serial No. 326,509.

This invention relates to windmills.

In the lubrication of the mill head it is important that all of the working parts be thoroughly lubricated whenever the mill is placed in action, which, of course, requires an adequate flow of oil to every part, and it is also important that there be no loss of oil by dripping but that all surplus oil be returned to the reservoir for use over and over again, to the end that one oiling of the mill will take care of one year's operation or even more. The necessity for this should be apparent; the head is located high in the air where it is not accessible for frequent inspection and it is a more or less dangerous task to climb the tower to inspect and oil the mill. It is, therefore, the principal object of our invention to provide a lubrication system whereby all of the working parts are assured of constant and automatic lubrication without any waste, making the mill smooth and quiet running, substantially trouble-proof, highly efficient, and extremely durable.

Some of the noteworthy features of the system are,

First, the provision of troughs on the cross-head and at the foot of the cross-head guides, the former of which is supplied with oil by a pump, the cylinder of which is formed by one of the cross-head guides, and the latter of which is supplied with oil partly by overflow from the other trough and partly by the pumping gears picking up oil from the oil reservoir and causing it to drip into said trough. With this arrangement there is assured adequate lubrication of the cross-head guides and the wrist pin bearing on the cross-head, as well as good lubrication of the wheel shaft and gear shaft, whose bearings are supplied with lubricant from the lower trough.

Second, the provision of an auxiliary, safety pump plunger operated by the cross-head cooperating with a cylinder supplied with oil from the lower trough whereby to supply an amount of oil to the trough on the cross-head sufficient to lubricate the cross-head guides and wrist pin bearing in the event the other pump fails, for any reason, to operate.

Third, the provision of a channel cast in the head leading from the lower trough to the front end bearing for the wheel shaft arranged to be supplied with oil overflowing from the upper and lower troughs, which oils is in turn arranged to flow by gravity to the front end bearing and thence back through a return channel by gravity to the reservoir. A special feature of this portion of the system is the extension of the return channel to a point in front of the front end bearing so that oil dripping therefrom is returned to the reservoir and is not allowed to go to waste.

These and other features of the lubrication system of our invention will appear in the course of the following detailed description in which reference is made to the accompanying drawings, wherein—

Figure 1 is a longitudinal vertical section through one side of the mill head, taken on the broken line 1—1 of Fig. 2, looking at the mechanism therein in side elevation, this view serving to show the channel leading to the front end bearing;

Fig. 2 is a view partly in horizontal section on the broken line 2—2 of Fig. 1, and partly in elevation, this view serving also to show the channel and its relationship to the lower trough;

Fig. 3 is a vertical cross-section taken on the line 3—3 of Fig. 1;

Fig. 4 is a vertical sectional detail taken on the line 4—4 of Fig. 2, serving to show the auxiliary pump and its cylinder for supplying lubricant from the lower trough to the upper trough; and Figs. 5 and 6 are sectional details taken on the lines 5—5 and 6—6 of Fig. 1.

The same reference numerals are applied to corresponding parts throughout the views.

The mill head 7 is preferably made in a single casting with an integral extension 8 toward the wheel 9, the head having an oil reservoir or well 10 formed therein into which a predetermined amount of oil is arranged to be poured for the lubrication of all of the working parts. A drain plug 11 provided at the lowest point of the reservoir permits drainage of the head when a fresh supply of oil is to be poured therein. A sheet metal helmet 12, fitting on a rim 13, serves to enclose the working parts to keep the oil in the head free from dirt and water. A hub 14 projects downwardly from the head and is arranged to rest on a ball bearing turntable on top of the tower, neither the turntable nor the upper end of the tower being shown. A tubular casing 15 is threaded at its upper end in the hub 14 to turn therewith relative to the tower as the head shifts its position according to the direction of the wind, and the plunger rod 16 is extended downwardly from the head through said casing. A chain 17 is extended upwardly through the casing 15 and threaded over a pulley 18 for connection with the vane 19 pivotally mounted on the head as at 20, the mill being arranged to be pulled out of the wind by means of the chain 17 in a manner well known in this art. So much for a general description of the head. We will now proceed to a description of the mechanism concerned in the lubrication system of our invention.

The pair of pumping gears 21 mounted on a shaft 22 in a bearing 23 in the head 7 are driven by a pair of pinions 24 mounted on the wheel shaft 25. The latter extends from a bearing 26 in the head through the extension 8, at the forward end of which it is received in what will hereinafter be referred to as the front end bearing 27, the latter being a two-part bearing with a cored out annular chamber 28 therebetween for a purpose presently to appear. The wind wheel 9 is mounted on the projecting end of the shaft 25 in the usual way. The gears 21 have crank pins 29 receiving the lower ends of pitmans 30 which are connected at their upper ends to a wrist pin 31 received in a bearing 32 in the crosshead 33. The latter has a pair of laterally spaced vertical bearings 34 for slidably mounting the same on cross-head guides 35 and 36. The former is simply a solid rod received in a socket 37 provided therefor in the head, but the latter is in the form of a tube passing through a hole 38 in the head for communication at its lower end with the bottom of the reservoir 10. A cross-piece 39 joins the upper ends of the guides 35 and 36 and provides a place for fastening the helmet 12, as indicated at 40. An apertured plug 41 in the lower end of the tubular guide 36 provides intake ports for the admission of oil from the reservoir into the guide. The latter is arranged to serve as a cylinder for a tubular oil pump plunger 42. The plunger has a cross-pin 43 passed through the upper end thereof and projecting through longitudinal slots 44 cut in the wall of the upper end of the tubular guide 36. An outwardly seating ball check valve 45 is arranged to close a central port in the plug 41 on the downstroke of the plunger 42 to trap oil in front of the plunger. Another outwardly seating ball check valve 46 is arranged to close a central port in the lower end of the plunger 42 on the upstroke thereof, the plunger being arranged to be raised by engagement of the cross-head guide 33 with the ends of the cross-pin 43. This general combination and arrangement of parts just described is fully disclosed and claimed in Bennethum Patent 1,669,319, issued May 8, 1928. No invention is, therefore, claimed in these details excepting only insofar as they form a part of novel combinations and arrangements hereinafter set forth.

The oil pumped by the plunger 42, it will be seen, will be discharged through the slots 44 into a trough 47 provided on the top of the cross-head 33 whereby to insure lubrication of the bearings 34 of the cross-head and likewise of the wrist pin bearing 32, the latter having an oil-hole 48 extended thereto from the trough as shown. The stroke of the plunger 42 is, of course, a certain fraction of the length of the stroke of the cross-head, and this pump, which will hereinafter be referred to as the main pump, has sufficient capacity in normal operation to supply not only enough oil to lubricate the wrist pin bearing and the cross-head guides but also a certain surplus arranged to overflow a lip 62 provided on the trough 47. The surplus oil overflowing the lip runs down the side of the adjacent bearing 34 and down the outside of the guide 36 into the trough 52.

We have still further departed from the construction of the Bennethum patent to the extent of providing a coiled compression spring 49 about the upper end of the tubular guide 36, acting between the cross-piece 39 and the projecting ends of pin 43, tending normally to move the plunger 42 downwardly on the discharge stroke, the plunger being arranged to be moved upwardly against the action of the spring on the intake stroke by means of the cross-head 33. It is of advantage to provide the spring 49 and not rely on gravity for the downstrokes of the plunger inasmuch as there are various contingencies apt to arise which might interfere with the easy movement of the plunger within the tubular guide, which need not be gone into at length, inasmuch as it should be apparent that a particle of grit might, in the case of a close fitting plunger, cause the same to bind. Then, too, we have preferred to fasten the plunger rod 16 to the middle of the cross-head 33 by threading into a boss 50 projecting upwardly from the trough 47, and have provided the wrist pin bearing 32 at a point alongside the plunger rod. Thus, there is not the slightest danger of oil seepage from the trough 47 down along the plunger rod. The neck 51 is extended sufficiently above the level of the lower trough 52, the details of which will be described presently, so that there will likewise be no danger of loss of oil from that source.

To proceed with the more important features of the lubrication system of our invention, it will be observed in Fig. 2 that the trough 52 is of elongated form extending from a point above the gear shaft 22 to a point above the wheel shaft 25, said shafts having oil holes 53 and 54, respectively, extended thereto from the trough to insure adequate lubrication thereof. Now, the pair of pumping gears 21 have laterally projecting oil dipping lugs 55 formed integral therewith on the side faces thereof presented to the trough 52 arranged to pick up oil from the reservoir 10 as the gears turn therein and supply oil to the trough by allowing the same to drip from the lugs into said trough as portrayed in Fig. 3. The trough 52 is, of course, narrow enough in the vicinity of the peripheries of the gears to afford sufficient clearance therefor, as shown in Fig. 2, but is broadened in the vicinity of the centers of the gears, as shown at 56, to reach beneath the lugs to catch oil dripped therefrom on the upper portion of the cycle of their movement. Thus, there is always a pool of oil in the trough 52 for lubrication of the bearings 23 and 26 through the holes 53 and 54. The oil dripping from the ends of these bearings returns, of course, directly to the reservoir. There is, in fact, so much oil supplied to the trough 52 partly from the lugs 55 but principally by overflow from the trough 47, that we have provided for the use of the surplus in two ways; one by pumping oil from the lower trough 52 to the upper trough 47, and the other by allowing surplus oil to flow by gravity from the trough 52 to the front end bearing 27, as will now be described in the order stated.

The cross-head 33 has a tubular oil pump plunger 57 fixedly mounted in a hole 58 in the bearing 34, in slightly spaced, parallel relation with the tubular guide 36, as best appears in Fig. 4. The plunger 57 thus communicates at its upper end with the trough 47. An outwardly seating ball check valve 59 is arranged to close a central port in the lower end of the plunger which, in turn, is arranged to be slidably received in a cylindrical bore 60 in the head 7 communicating with a low point of the trough 52 and arranged to serve as a cylinder for the plunger. It will, therefore, appear that as the cross-head reciprocates up and down on its guides the oil pump plunger 57 is caused to enter the bore 60 to a predetermined depth on each downstroke of the cross-head. On the downstroke the oil in the bore 60 is, of course, trapped and the check valve 59 will unseat to permit this oil to enter the plunger 57, thus causing a spurt of oil from the upper end of the plunger into the trough 47. On the upstroke of the plunger the check valve 59 seats again to retain the oil therein, and at the upper end of the stroke the plunger leaves the bore, as shown in Fig. 4, to permit the latter to be filled with oil again from the trough 52. The entrance end of the bore 60 is suitably flared, as indicated at 61, to guide the end of the plunger therein and thereby insure smooth operation. Now, it should be evident that this means of pumping oil to the trough 47 is absolutely positive and that the supply of oil for the trough 52 is definitely assured at all times by reason of the oil dipping lugs 55 and is, furthermore, ordinarily assured by overflow from the trough 47, as stated before. Thus, there can be no doubt as to the adequate lubrication of the wrist pin bearing and the cross-head guides. If the oil pump plunger 42 were relied upon entirely there might be danger of the wrist pin bearing and cross-head guides running dry if, for any reason, the plunger 42 failed to operate, even where the precaution is taken to provide the spring 49. There is, of course, under ordinary circumstances no likelihood of the plunger 42 failing to operate but, in view of the fact that the mill head is perhaps the most abused and neglected part of a farm equipment, it is deemed advisable to take the precaution of providing what might be termed an auxiliary, safety oil pump. Even where the plunger 42 is entirely out of commission it is found that the plunger 57 can be relied upon to furnish sufficient oil for the lubrication of the wrist pin bearing and cross-head guides. Where both plungers are in operation the surplus oil, as stated before, is arranged to overflow the lip 62 to flow by gravity to the trough 52. Surplus oil in the trough 52 is arranged to overflow the lip 63, this surplus oil being arranged to be conducted to the front end bearing in a manner now to be described.

A pocket 64 is formed in one side of the head directly beneath the lip 63 to catch the oil overflowing therefrom, and this pocket communicates with a channel 65 formed in one side wall of the extension 8 leading on an incline to the chamber 28, previously referred to, whereby to furnish oil by gravity to the front end bearing 27 between the two sections thereof. There is thus insured an adequate supply of oil to said bearing just as well as to other bearings, and the difficulty of keeping this bearing from running dry, which has always been a problem in the design and construction of mill heads, is absolutely eliminated. Oil can, of course, collect in the chamber 28 only to the level of the lower end of the rib defining the inner side of the channel 65, so that excess oil will overflow the side of the channel at the point 66 into a return channel 67 provided on the bottom wall of the extension 8 and leading from the bearing 27 on an incline to the reservoir 10 so that oil draining into the channel 67 flows by gravity back to the oil reservoir. The return channel 67 is extended beneath both sections of the bearing 27 to a point in front thereof where it communicates with an annular chamber 68. Thus, any oil seeping through the front section of the front end bearing will drip into the channel 67 and be returned to the oil reservoir. The old difficulty of oil dripping from the front end bearing, which has always been another problem in the design and construction of mill heads is, therefore, positively eliminated and incidentally the danger of having the supply of oil in the oil reservoir run low is materially diminished.

In operation, the lubrication of the various parts is accomplished as follows: The oil is poured into the head approximately to the level of the dotted line in Fig. 3 so as to immerse the lower portions of the gears 21 and pinions 24. Oil is pumped from the reservoir by the plunger 42 into the trough 47 for lubrication of the wrist pin bearing 32 and the bearings 34 operating on the cross-head guides 35 and 36, the surplus oil being normally arranged to overflow the lip 62 to supply some oil to the trough 52. Oil is also picked up by the lugs 55 on the gears 21 and caused to drip into the trough 52. Thus, the bearings 23 and 26 for the gear shaft 22 and wheel shaft 25, respectively, are always assured of adequate lubrication. Oil is also pumped from the trough 52 by the plunger 57 up into the trough 47 so as to add to the oil pumped by the plunger 42, in the event the latter is operating satisfactorily. If, for any reason, the same is out of commission the oil pumped by the plunger 57, which is positive in its operation and is bound to pump oil whenever the gears 21 are turned, will insure adequate lubrication of the wrist pin bearing and the cross-head guides. There is bound to be surplus oil supplied to the troughs 47 and 52 under normal operating conditions and, in any event, that will be the case so far as the trough 52 is concerned. This surplus oil is conducted to the front end bearing 27 for the wheel shaft 25 and the adequate lubrication thereof is, therefore, assured. Inasmuch as every precaution is taken in the design and construction of the mill head to avoid the dripping of oil therefrom and a consequent diminishing of the supply in the reservoir, there is no reason why a head embodying the present lubrication system should not operate smoothly at least for a year with one oiling and there is never any occasion for climbing the tower to inspect the head to be sure that all of the working parts are being properly lubricated. In passing, it may be stated that while plain journal bearings are shown at 23, 26, 27 and 32 any one or more, or all, of these bearings may be provided of an anti-friction type to make the mill operate more easily and quietly.

It is believed that the foregoing description conveys a good understanding of our invention. While reference has been made to various specific details of construction and arrangement, it should be understood that the invention is not to be regarded as entirely limited thereto, inasmuch as various changes might be made without sacrificing the more important advantages. All legitimate modifications and adaptations are, therefore, intended to be covered in the appended claims.

We claim:

1. In a windmill, a combined cross-head guide and pump comprising a stationary tubular outer section having its lower end provided with a valve-controlled oil intake and its upper end with an oil outlet, a reciprocatory inner tubular section having its lower end provided with a valve-controlled oil intake and arranged to discharge oil from the upper end thereof into the outer section for discharge from the outlet thereof, a cross-head reciprocable on the outer section, a cross-pin projecting from the inner section through a slot in the outer section into the path of the cross-head for positive operation of said inner section by the cross-head in the movement of the latter in one direction on the guide, and a coiled compression spring fitting about the outer section and bearing at one end on a part fixed with relation to the outer section and having its other end bearing on the projecting end of the cross-pin for returning the inner section after movement thereof by the cross-head.

2. In a windmill, the combination in the mill head of an oil reservoir in said head, pumping gears in said head operating immersed in the oil in said reservoir, a cross-head guide extending upwardly from the head, a trough above the reservoir continuously supplied with oil from the reservoir in the operation of the pumping gears, a reciprocatory cross-head operating on said guide and adapted to operate a pump rod, an oil pump plunger mounted on the cross-head to reciprocate therewith, said plunger having the lower end thereof provided with a valve-controlled oil intake and having the upper end thereof arranged to discharge oil, as, for example, onto the top of the cross-head, and a cylinder in the trough arranged to have the plunger reciprocate into and out of the same, the lower end of said cylinder being closed but the upper end thereof being open and being arranged to be supplied with oil from the trough.

3. A structure as set forth in claim 4 wherein the open end of the cylinder bore is flared to guide the lower end of the plunger therein.

4. In a windmill, the combination in the mill head of a cross-head guide extending upwardly from the head, a reciprocatory cross-head operating on said guide and adapted to operate a pump rod, an oil pump plunger mounted on the cross-head to reciprocate therewith, said plunger having the lower end thereof provided with a valve-controlled oil intake and having the upper end thereof arranged to discharge oil, as, for example, onto the top of the cross-head there being an oil pocket provided on said head, and a cylinder provided in said head arranged to have the plunger reciprocate into and out of the same, said cylinder having the lower end thereof closed but having the upper end thereof open and communicating with said pocket to be supplied with oil therefrom on each occasion that the plunger leaves the cylinder, the said plunger on each return into the cylinder serving to clear the open upper end thereof of an obstruction and also expel oil collected in the cylinder.

5. In a windmill, the combination in the mill head, comprising a pair of stationary guides, a cross-head operating thereon adapted for operating a pump rod, a wind wheel shaft received in a bearing in the mill head, a gear shaft also received in a bearing therein, gears providing a connection between the two shafts, and means providing an operating connection between the gears and the cross-head for reciprocating the latter, said head having an oil reservoir providing for the lubrication of said gears by immersion thereof, of a trough having communication with the bearings for said shafts to provide for their lubrication, means whereby oil is supplied from the reservoir to the trough, a pump plunger mounted on the cross-head for reciprocation therewith, the same having a valve-controlled intake at its lower end and communicating at its upper end with the top of the cross-head, and a cylinder for said plunger supplied with oil from said trough.

6. In a windmill, the combination in the mill head, comprising a pair of stationary guides, a cross-head operating thereon adapted for operating a pump rod, a wind wheel shaft received in a bearing in the mill head, a gear shaft also received in a bearing therein, gears providing a connection between the two shafts, and means providing an operating connection between the gears and the cross-head for reciprocating the latter, said head having an oil reservoir providing for the lubrication of said gears by immersion thereof, of a trough having communication with the bearings for said shafts to provide for their lubrication, means whereby oil is supplied from the reservoir to the trough, and oil pumping means operated in the reciprocation of the cross-head supplied with oil from the trough and arranged to discharge the same onto the top of the cross-head for lubrication of the guides.

7. In a windmill, the combination in the mill head having an oil reservoir therein, of a pair of guides, a cross-head reciprocating thereon adapted to operate a pump rod, one of said guides serving as a pump cylinder communicating at its lower end with the oil reservoir and communicating at its upper end with the top of the cross-head, the lower end being provided with a valve-controlled intake, a pump plunger reciprocable in said guide, the same having a valve-controlled intake at the lower end thereof and being arranged to discharge oil from the upper end, means whereby the plunger is raised positively in the upstrokes of the cross-head for discharge of oil, the plunger being arranged to return normally without the agency of the cross-head, another pump plunger fixed on the cross-head for positive reciprocation therewith, the same having a valve-controlled intake at its lower end and being in communication with the top of the cross-head at its upper end, and a cylinder into and out of which the plunger is arranged to reciprocate, said cylinder being arranged to be supplied with oil whenever the plunger leaves the cylinder.

8. In a windmill, the combination in the mill head having an oil reservoir therein, of one or more guides, a cross-head reciprocating thereon adapted to operate a pump rod, a main oil pump supplied with oil from the reservoir and adapted to discharge oil on top of the cross-head for lubrication of the guides, means providing an operating connection for said pump with said cross-head whereby the pump is operated positively on the intake stroke by the cross-head in the movement thereof in one direction, the said pump being arranged normally to go through its discharge stroke without the agency of the cross-head, and an auxiliary safety pump also arranged to discharge oil onto the top of the cross-head for lubrication of the cross-head guides, said pump having a positive operating connection with the cross-head for continuous positive operation thereby, the auxiliary pump being thereby arranged to supply an additional amount of oil on top of the cross-head during the operation of the main pump and at least sufficient oil for adequate lubrication of the cross-head guides in the event of failure of the main pump to operate.

9. A structure as set forth in claim 11 including a trough provided on said head for supplying lubrication to bearings such as a wheel shaft bearing and a gear shaft bearing, and means whereby oil is supplied to said trough from the reservoir whenever the mill is thrown into operation, the auxiliary safety pump being supplied with oil from said trough and being arranged to withdraw surplus oil therefrom.

10. In a windmill, the combination in the mill head having an oil reservoir therein, of a pair of guides projecting upwardly from the head, a cross-head reciprocating thereon adapted to operate a pump rod, gears immersed in the oil in the reservoir having an operating connection with the cross-head, the same being arranged to be turned whenever the mill is thrown into operation, a shaft received in a bearing in said head having the gears mounted thereon, an oil trough provided on top of said cross-head for lubrication of the guides, another oil trough provided on the head for lubrication of the gear shaft bearing, one of the guides including means arranged therein and operated from the cross-head for pumping oil from the reservoir into the cross-head trough, the cross-head trough being so proportioned and arranged with reference to the other trough to supply a certain amount of oil to the latter by overflow therefrom, and dippers on the gears arranged in the turning thereof in the oil to pick up oil from the reservoir to supply the same by drippage into the other trough.

11. In a windmill, the combination in the mill head having an oil reservoir therein, of a wind wheel shaft, front and rear bearings for the opposite ends of said shaft, the former being provided in an extension of said head and the latter within the head, there being pump gearing in said head having connection with the shaft for operation thereby, a trough in said head for lubrication of the rear bearing disposed at a predetermined elevation above the front bearing, a conduit provided in said head extension extending outwardly from the trough in the head proper to the front end bearing, means for supplying oil to the trough from the reservoir whenever the mill is thrown into operation whereby to supply oil to the conduit, and a return conduit in the lower portion of said head extension extending inwardly from the front end bearing back to the head for return of the oil to the reservoir.

12. In a windmill, the combination in the mill head having an oil reservoir therein, of a wind wheel shaft, front and rear bearings for the opposite ends of said shaft, the former being provided in an extension of said head and the latter within the head, there being pump gearing in said head having connection with the shaft for operation thereby, a trough in said head for lubrication of the rear bearing disposed at a predetermined elevation above the front bearing, a conduit provided in said head extension extending outwardly from the trough in the head proper to the front end bearing, said trough having communication with the conduit over an overflow wall of a predetermined height which serves to retain a certain amount of oil in said trough, means for supplying oil to the trough from the reservoir whenever the mill is thrown into operation whereby to supply oil to the conduit, and a return conduit in the lower portion of said head extension extending inwardly from the front end bearing back to the head for return of the oil to the reservoir.

13. In a windmill, the combination in the mill head having an oil reservoir therein, of a wind wheel shaft, front and rear bearings for the opposite ends of said shaft, the former being provided in an extension of said head in two portions spaced longitudinally of the shaft providing an oil receiving chamber therebetween and the latter being provided within the head, there being pump gearing in said head having connection with the shaft for operation thereby, a supply conduit provided in said head extension extending outwardly from the head proper to the intermediate chamber of the front end bearing, the supply conduit being inclined downwardly from the head toward the bearing to supply oil by gravity to the bearing, said conduit being arranged to be supplied with oil from the reservoir whenever the mill is thrown into operation, and a return conduit in the lower portion of said head extension extending inwardly from the front end bearing back to the head for return of the oil to the reservoir, the latter conduit being inclined downwardly from the bearing toward the head for the return of the oil by gravity from the bearing to the reservoir.

14. In a windmill, the combination in the mill head having an oil reservoir therein, of a wind wheel shaft extending from the head through a front end bearing in a head extension, there being pump gearing in the head having connection with the shaft for operation thereby, a chamber provided in the head extension dividing the front end bearing into fore and aft sections, and a duct provided in one side wall of said extension leading from the head proper on an incline downwardy toward the bearing and communicating with the side of the chamber intermediate the bearing sections, the bottom wall of said head extension providing a return channel extending inwardly from the bearing on an incline downwardly toward the head proper for the return of oil from the bearing to the oil reservoir.

15. In a windmill, the combination in the mill head having an oil reservoir therein, of a wind wheel shaft extending from the head through a front end bearing in a head extension, there being pump gearing in the head having connection with the shaft for operation thereby, a chamber provided in the head extension dividing the front end bearing into fore and aft sections, and a duct provided in one side wall of said extension leading from the head proper on an incline downwardly toward the bearing and communicating with the chamber intermediate the bearing sections, the bottom wall of said head extension providing a return channel extending inwardly from the bearing on an incline downwardly toward the head proper for the return of oil from the bearing to the oil reservoir, there being still another chamber provided in said head extension in front of the front end bearing to receive oil dripping from said bearing, and there being a channel provided in said head extension leading from said chamber beneath the bearing for the return of this oil with the rest of the oil in to the oil reservoir.

16. A structure as set forth in claim 19 wherein said duct has an overflow lip at a certain elevation relative to said bearing whereby excess oil is arranged to be bypassed directly to the return channel.

17. In a windmill, the combination in the mill head having an oil reservoir therein, of a cross-head adapted to operate a pump rod, guides on the mill head having the cross-head reciprocating thereon, a wind wheel shaft extending from a bearing in the head through a front end bearing provided in a head extension, pump gearing in the head operated from said shaft and operatively connected with the cross-head, a trough provided on the mill head arranged to provide lubrication for the first mentioned bearing for the shaft and suitably for other bearings, means arranged in the operation of the pump gearing to carry oil from the reservoir to the trough, said trough having an overflow lip for the discharge of surplus oil therefrom, and a conduit provided in the head extension leading from the head to the front end bearing, the same being arranged to be supplied with oil overflowing from the lip, and there being preferably a return conduit provided in the head extension leading from the bearing back to the head for the return of oil to the reservoir.

18. In a windmill, the combination in the mill head having an oil reservoir therein, of a cross-head adapted to operate a pump rod, guides on the mill head having the cross-head reciprocating thereon, a wind wheel shaft extending from the head through a front end bearing provided in a head extension, pump gearing in the head operated from said shaft and operatively connected with the cross-head, a trough provided on the top of the cross-head for supplying oil to the cross-head guides, means arranged in the operation of the cross-head to pump oil from the reservoir to the trough, said trough having an overflow lip for the discharge of surplus oil therefrom, and a conduit provided in the head extension leading from the head to the front end bearing, the same being arranged to be supplied with oil overflowing from the lip, and there being preferably a return conduit provided in the head extension leading from the bearing back to the head for the return of oil to the reservoir.

19. In a windmill, the combination in the mill head having an oil reservoir therein, of a cross-head adapted to operate a pump rod, guides on the mill head having the cross-head reciprocating thereon, a wind wheel shaft extending from a bearing in the head through a front end bearing provided in a head extension, pump gearing in the head operated from said shaft and operatively connected with the cross-head, a trough provided on the mill head arranged to provide lubrication for the first mentioned bearing for the shaft and suitably for other bearings, means arranged in the operation of the pump gearing to carry oil from the reservoir to the trough, said trough having an overflow lip for the discharge of surplus oil therefrom, a trough provided on the top of the cross-head for supplying oil to the cross-head guides, means arranged in the operation of the cross-head to pump oil from the reservoir to the trough, there being an overflow lip on the latter trough whereby surplus oil is arranged to be supplied to the first trough, and a conduit provided in the head extension leading from the head to the front end bearing, the same being arranged to be supplied with oil overflowing from the first trough, and there being preferably a return conduit provided in the head extension leading from the bearing back to the head for the return of oil to the reservoir.

20. In a windmill comprising a mill head, a pair of parallel cross-head guide rods extending vertically therefrom, one of said rods being tubular and serving as an oil pump cylinder having its lower end provided with a valve-controlled oil intake, a reciprocatory pump plunger in said cylinder having its lower end provided with a valve-controlled oil intake and arranged to discharge oil from the upper end thereof for discharge from the cylinder, a cross-head reciprocable on the guide rods, a cross-pin projecting from the plunger through diametrically opposed longitudinal slots provided in the wall of the cylinder at the upper end of the latter, the same constituting the oil outlet for said cylinder, said pin projecting sufficiently from the cylinder for engagement therewith by the cross-head for positive operation of the plunger upwardly, a coiled compression spring fitting about the rod serving as the pump cylinder and bearing at its lower end on the projecting ends of the cross-pin to move the plunger normally downwardly, and a cross-member on the upper ends of the guide rods, having the upper end of the coiled compression spring bearing against the under side thereof.

21. A structure as set forth in claim 6 wherein the open end of the cylinder bore is flared to guide the lower end of the plunger therein.

22. In a windmill comprising a mill head and a wind wheel shaft extending therefrom, a mill head extension for supporting the outer end of said shaft having a bearing in the outer end thereof having said shaft extending therethrough, a chamber provided in said extension dividing the bearing into fore and aft sections, a duct provided in one wall of said extension and extending longitudinally of the extension to the chamber from the mill head, said duct being supplied with oil in the operation of the windmill, and a return channel in the bottom wall of said extension extending from the bearing to the mill head for the return of oil to the latter.

23. In a windmill comprising a mill head and a wind wheel shaft extending therefrom, a mill head extension for supporting the outer end of said shaft having a bearing in the outer end thereof having said shaft extending therethrough, a chamber provided in said extension dividing the bearing into fore and aft sections, a duct provided in one wall of said extension and extending longitudinally of the extension to the chamber from the mill head, said duct being supplied with oil in the operation of the windmill, and a return channel in the bottom wall of said extension extending from the bearing to the mill head for the return of oil to the latter, there being still another chamber provided in the outer end of said extension beyond said bearing, said chamber communicating with the return channel.

24. In a windmill comprising a mill head and a wind wheel shaft extending therefrom, a mill head extension for supporting the outer end of said shaft having a bearing in the outer end thereof having said shaft extending therethrough, a chamber provided in said extension dividing the bearing into fore and aft sections, a duct provided in one side wall of said extension and extending longitudinally thereof to the side of said chamber from the mill head, said duct being supplied with oil from the mill head during the operation of the windmill whereby to deliver oil to the aforesaid chamber, said duct having communication with the inside of said extension at one elevation and with the chamber at a lower elevation whereby the same is arranged to maintain only a predetermined level of oil in said chamber, and a return channel in the bottom of said extension for returning oil from the bearing to the mill head.

25. In a windmill comprising a mill head and a wind wheel shaft extending therefrom, a mill head extension for supporting the outer end of said shaft having a bearing in the outer end thereof having said shaft extending therethrough, a chamber provided in said extension dividing the bearing into fore and aft sections, a duct provided in one side wall of said extension and extending longitudinally thereof to the side of said chamber from the mill head, said duct being supplied with oil from the mill head during the operation of the windmill whereby to deliver oil to the aforesaid chamber, said duct having communication with the inside of said extension at one elevation and with the chamber at a lower elevation whereby the same is arranged to maintain only a predetermined level of oil in said chamber, and a return channel in the bottom of said extension for returning oil from the bearing to the mill head, there being still another chamber provided in the outer end of said extension beyond said bearing, said chamber communicating with the return channel.

In witness whereof we have hereunto affixed our signatures.

FRANK J. HALLER.
CLARENCE B. MOLTER.

CERTIFICATE OF CORRECTION.

Patent No. 1,839,549. Granted January 5, 1932, to

FRANK J. HALLER ET AL.

It is hereby certified that error appears in the printed specification of the above numbered patent requiring correction as follows: Page 4, line 121, claim 3, for the numeral "4" read 2; page 5, line 114, claim 9, for the numeral "11" read 8; page 7, line 7, claim 16, for "19" read 14, and line 121, claim 21, for "6" read 4; and that the said Letters Patent should be read with these corrections therein that the same may conform to the record of the case in the Patent Office.

Signed and sealed this 1st day of March, A. D. 1932.

(Seal)

M. J. Moore,
Acting Commissioner of Patents.